United States Patent
Kancherla

(10) Patent No.: US 9,438,702 B2
(45) Date of Patent: *Sep. 6, 2016

(54) TECHNIQUES FOR PROTECTING AGAINST DENIAL OF SERVICE ATTACKS

(71) Applicant: Brocade Communications Systems, Inc., San Jose, CA (US)

(72) Inventor: Mani Kancherla, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,532

(22) Filed: Apr. 6, 2015

(65) Prior Publication Data

US 2015/0215436 A1 Jul. 30, 2015

Related U.S. Application Data

(63) Continuation of application No. 13/871,956, filed on Apr. 26, 2013, now Pat. No. 9,027,129.

(60) Provisional application No. 61/640,672, filed on Apr. 30, 2012, provisional application No. 61/666,668, filed on Jun. 29, 2012, provisional application No. 61/799,218, filed on Mar. 15, 2013.

(51) Int. Cl.
  *H04L 29/06* (2006.01)
  *H04L 29/08* (2006.01)

(52) U.S. Cl.
  CPC ......... *H04L 69/166* (2013.01); *H04L 63/1458* (2013.01); *H04L 67/32* (2013.01)

(58) Field of Classification Search
  None
  See application file for complete search history.

(56) References Cited

U.S. PATENT DOCUMENTS

| | | | |
|---|---|---|---|
| 5,958,053 A | 9/1999 | Denker | |
| 6,601,101 B1 * | 7/2003 | Lee | H04L 67/1008 709/202 |
| 6,772,334 B1 * | 8/2004 | Glawitsch | H04L 63/126 713/153 |
| 6,779,033 B1 | 8/2004 | Watson et al. | |
| 6,826,613 B1 * | 11/2004 | Wang | G06F 3/0607 709/202 |
| 7,010,605 B1 | 3/2006 | Dharmarajan | |
| 7,584,352 B2 | 9/2009 | Boivie et al. | |
| 7,921,282 B1 | 4/2011 | Mukerji et al. | |
| 8,200,957 B1 | 6/2012 | Mukerji et al. | |
| 9,106,479 B1 * | 8/2015 | Mukerji | H04L 29/08072 |
| 2001/0042200 A1 | 11/2001 | Lamberton et al. | |

(Continued)

OTHER PUBLICATIONS

Zuquete, A., "Improving the Functionality of SYN Cookies", B. Jerman-Blazi et al. (eds.), Avdanced Communications and Multimedia Security, Copyright Springer Science+Business Media New Yowk 2002.*

(Continued)

*Primary Examiner* — Andrew Nalven
*Assistant Examiner* — Christopher Ruprecht
(74) *Attorney, Agent, or Firm* — Fountainhead Law Group P.C.

(57) ABSTRACT

Techniques for protecting against denial of service attacks are provided. In one embodiment, a network device can extract one or more values from a Transmission Control Protocol (TCP) ACK packet sent by a client device, where the one or more values encode TCP option information. The network device can further decode the one or more values to determine the TCP option information and embed the TCP option information into the TCP ACK packet. The network device can then forward the TCP ACK packet with the embedded TCP option information to a server.

25 Claims, 7 Drawing Sheets

(56) References Cited

U.S. PATENT DOCUMENTS

| | | | |
|---|---|---|---|
| 2003/0135625 A1* | 7/2003 | Fontes | H04L 63/12 709/228 |
| 2004/0008681 A1* | 1/2004 | Govindarajan | H04L 29/06 370/394 |
| 2006/0029000 A1* | 2/2006 | Waldvogel | H04L 69/16 370/254 |
| 2006/0281451 A1 | 12/2006 | Zur | |
| 2007/0185998 A1* | 8/2007 | Touitou | H04L 63/168 709/227 |
| 2007/0195792 A1 | 8/2007 | Chen et al. | |
| 2007/0239886 A1 | 10/2007 | Montemayor et al. | |
| 2007/0300290 A1* | 12/2007 | Shay | H04L 63/0428 726/3 |
| 2009/0161680 A1* | 6/2009 | Ishikawa | H04L 69/16 370/400 |
| 2010/0161741 A1 | 6/2010 | Jiang et al. | |
| 2010/0235902 A1* | 9/2010 | Guo | H04L 1/1671 726/12 |
| 2011/0131646 A1 | 6/2011 | Park et al. | |
| 2011/0185073 A1* | 7/2011 | Jagadeeswaran | H04L 69/16 709/228 |
| 2012/0227088 A1* | 9/2012 | Gao | H04L 63/126 726/3 |
| 2012/0278492 A1 | 11/2012 | Jiang et al. | |
| 2014/0208152 A1* | 7/2014 | Magoshi | H04L 67/00 714/4.1 |

OTHER PUBLICATIONS

Bae, S. et al., "Browsing Architecture with Presentation metadata for the Internet of Things," 2011 IEEE 17th International Conference on Parallel and Distributed Systems, Copyright 2011 IEEE.*

Eddy, W., "Additional TCP Experimental-Use Options", Network Working Group Internet-Draft, Aug. 16, 2011.*

Zuquete, A., "Improving the Functionality of SYN Cookies", b. Jerman-Blazi et al. (eds.), Advanced Communications and Multimedia Security, Copyright Springer Science+Business Media New York 2002.

Eddy, W., "Extending the Space Available for TCP Options", Network Working Group Internet-Draft, Jul. 1, 2008.

Ramaiah, A., "TCP Options Space Extension", TCPM WG Internet-Draft, Mar. 25, 2012.

Radhakrishnan, S. et al., "TCP Fast Open", ACM CoNext 2011, Dec. 6-9, 2011, Tokyo, Japan. Copyright 2011 ACM.

Honda, M. et al., "Is it Still Possible to Extend TCP?", IMC'11, Nov. 2-4, 2011, Berlin, Germany. Copyright 2011 ACM.

Di Francesco, P., et al., "A New Distributed Defense to Distributed Denial of Service Attacks".

U.S. Appl. No. 13/871,956, filed Apr. 26, 2013.

Notice of Allowance mailed Jan. 7, 2015 in U.S. Appl. No. 13/871,956; 19 pages.

* cited by examiner

TECHNIQUES FOR PROTECTING AGAINST DENIAL OF SERVICE ATTACKS

CROSS REFERENCES TO RELATED APPLICATIONS

The present application is a continuation of U.S. application Ser. No. 13/871,956, filed Apr. 26, 2013, now U.S. Pat. No. 9,027,129, issued May 5, 2015, entitled "TECHNIQUES FOR PROTECTING AGAINST DENIAL OF SERVICE ATTACKS." which claims the benefit and priority under 35 U.S.C. 119(e) of the following applications:
1) U.S. Provisional Application No. 61/640,672, filed Apr. 30, 2012, entitled "METHOD FOR DEFENDING DDOS ATTACK";
2) U.S. Provisional Application No. 61/666,668, filed Jun. 29, 2012, entitled "SYNCOOKIE IN DSR MODE"; and
3) U.S. Provisional Application No. 61/799,218, filed Mar. 15, 2013, entitled "TECHNIQUES FOR PROTECTING AGAINST DENIAL OF SERVICE ATTACKS".

The entire contents of the foregoing applications are incorporated herein by reference for all purposes.

BACKGROUND

Application delivery switches, also known as Layer 4-7 switches or application delivery controllers, are network devices that optimize the delivery of cloud-based applications (e.g., Web, mobile, etc.) to client devices. Application delivery switches offer features such as server load balancing, data compression, caching, content transformation, application level security and QoS (Quality of Service), and so on. Some application delivery switches, such as the ADX Series of switches developed by Brocade Communications Systems, Inc., provide protection against certain forms of Denial of Service attacks (DoS), including Transmission Control Protocol (TCP) SYN attacks. The mechanism currently implemented in ADX Series switches for protecting against TCP SYN attacks is known as "SynProxy."

FIG. 1 depicts a typical TCP connection flow 100 between a client device 102, an existing ADX series switch (ADX) 104, and a server 106 when SynProxy is enabled. At step 1a of flow 100, client device 102 initiates a standard TCP three-way handshake by transmitting a TCP SYN packet to server 106. The TCP SYN packet includes TCP connection information (e.g., a sequence number and TCP options) that is generated by client device 102. At step 1b, ADX 104 intercepts the TCP SYN packet and returns a TCP SYN ACK packet to client device 102 that includes an ADX-generated sequence number (also known as a SYN cookie). The SYN cookie, which encodes the TCP options originally sent by client device 102 at step 1a, is generated using an algorithm that is proprietary to ADX 104. At step 1c, client device 102 receives the TCP SYN ACK packet and responds with a TCP ACK packet that includes the SYN cookie value+1. ADX 104 then intercepts the TCP ACK packet and validates the SYN cookie value included in the packet using its SYN cookie algorithm.

If ADX 104 determines that the SYN cookie value included in the TCP ACK packet is valid, ADX 104 concludes that client device 102 is valid/non-malicious. As a result, ADX 104 establishes a first TCP connection with client device 102 and stores state information for this client-side connection (e.g., client-generated sequence number, ADX-generated sequence number, and TCP options). ADX 104 thereafter engages in a second TCP three-way handshake with server 106 (steps 2a, 2b, and 2c). As part of the second TCP three-way handshake, ADX 104 establishes a second TCP connection with server 106 and stores state information for this server-side connection (e.g., server-generated sequence number, ADX-generated sequence number, and TCP options). Finally, at steps 3a and 3b, ADX 104 begins forwarding TCP data packets between client device 102 and server 106. As part of this process, ADX 104 translates, using the stored state information, TCP connection information included in the data packets to bridge the first (i.e., client-side) and second (i.e., server-side) TCP connections.

In some scenarios, it is useful to configure ADX 104 in a "Direct Server Return" (DSR) mode where ADX 104 does not see return (i.e., server-to-client) packets. This allows ADX 104 to handle more connections than possible in the "in-line" mode shown at steps 3a and 3b of FIG. 1. Unfortunately, ADX Series switches currently do not support SynProxy functionality in combination with DSR mode. As noted with respect to FIG. 1, in order to implement SynProxy, ADX 104 must act as an intermediary for all TCP data traffic between client device 102 and server 106 in order to translate TCP connection information between those two entities. In DSR mode, return traffic from server 106 to client device 102 completely bypasses ADX 104, thereby preventing ADX 104 from performing the translation needed for SynProxy.

SUMMARY

Techniques for protecting against DoS attacks are provided. In one embodiment, a network device can extract one or more values from a TCP ACK packet sent by a client device, where the one or more values encode TCP option information. The network device can further decode the one or more values to determine the TCP option information and embed the TCP option information into the TCP ACK packet. The network device can then forward the TCP ACK packet with the embedded TCP option information to a server.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Figure 1:
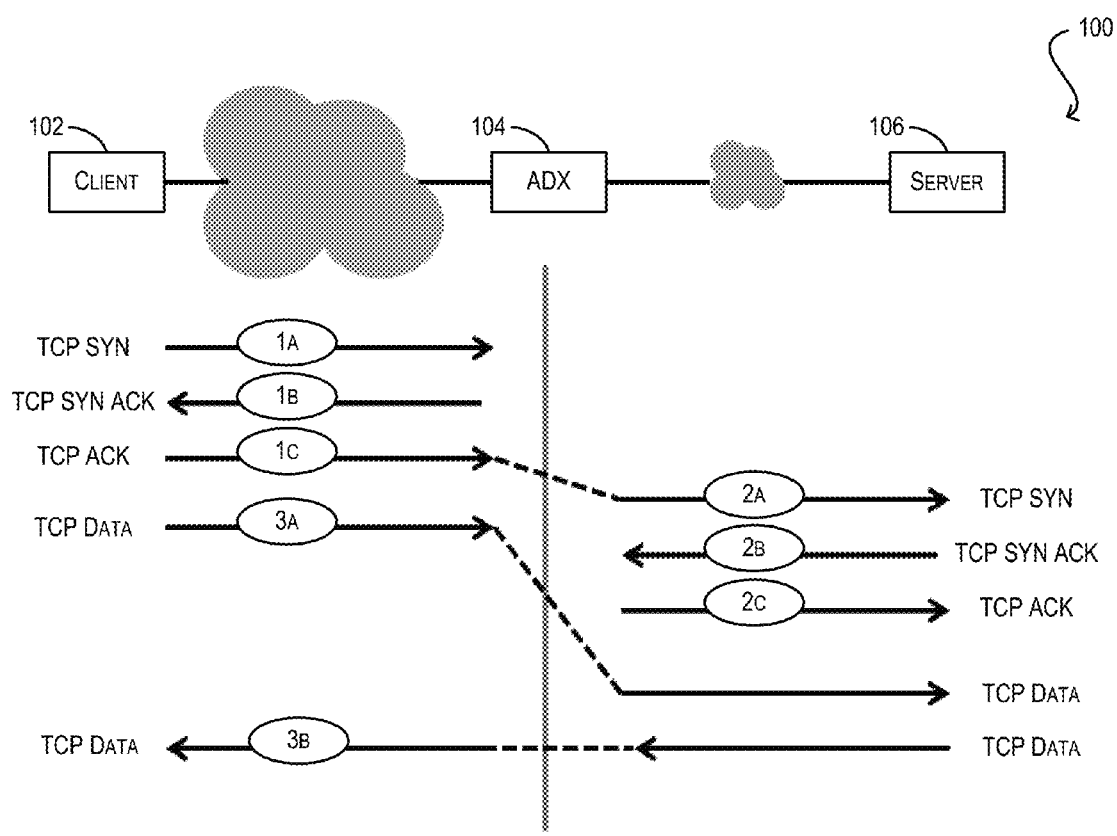
FIG. 1 depicts an exemplary TCP connection flow for protecting against DoS attacks.

Embodiments of the present invention provide techniques that can be implemented by a network switch and a server for protecting the switch and server against TCP SYN and/or ACK attacks, without requiring server-to-client TCP data traffic to pass through the switch. In one embodiment, the second TCP three-way handshake shown at steps 2a, 2b, and 2c of FIG. 1 is not performed between the switch and server. Instead SYN cookie functionality is enabled on the server so that the server can establish a new TCP connection based on a valid ACK. In such a solution, the switch can first engage in a TCP three-way handshake with a client device requesting a TCP connection to the server per steps 1a, 1b, and 1c of FIG. 1. However, when the switch receives the TCP ACK packet from the client device as the final part of the handshake, the switch does not need to initiate a second TCP three-way handshake with the server. Rather, the switch can forward the TCP ACK packet directly to the server with some additional information, thereby transferring the TCP connection information that the switch negotiated with the client device via the client-side three-way handshake. Since SYN cookie functionality on the server is enabled, the server can then establish a TCP session with the client device based on the TCP connection information in the TCP ACK packet.

With this approach, there is no need for the switch to proxy TCP data traffic between the client device and server because the client device and server can communicate via a single TCP session (with a single set of TCP connection parameters). This allows the switch to provide TCP SYN/ACK flood protection while operating in a DSR (or some other similar) mode. This approach can also be used in scenarios where the switch remains "in-line" between the client device and server (and thus intercepts all traffic between these two entities); in these cases, the switch can simply forward TCP data traffic, without performing any translation. This provides for greater efficiency over a standard SynProxy-based solution.

One aspect of the foregoing approach is that the server should be able to accept the TCP ACK packet sent by the switch as a valid ACK packet per the server's SYN cookie algorithm, even though the TCP ACK packet includes a SYN cookie (in the ACK# field of the ACK packet) that was originally generated by the switch during the TCP three-way handshake with the client device. Further the server should be able to determine the TCP options that originated from the client device (these TCP options are encoded in the SYN cookie) in order to establish the TCP connection.

One way to ensure the server can successfully validate and decode the SYN cookie in the TCP ACK packet is to replicate the SYN cookie algorithm from the switch on the server. However, this technique is inefficient and insecure since the switch's SYN cookie algorithm may be proprietary to the switch vendor and may rely on random input that changes over time.

A better technique is (1) for the server to accept the TCP ACK packet from the switch as valid without performing any validation using its own SYN cookie logic, and (2) for the switch to decode the SYN cookie and embed the TCP options in the TCP ACK packet (in, e.g., a standard, published format) so that the server can extract the TCP options upon receiving the packet. For example, the switch can embed the TCP options into a particular TCP option field of the TCP ACK packet having a reserved type, or kind (e.g., 252). With this technique, the SYN cookie logic/algorithm on the switch can remain secret to the switch itself, because the server does not need to do any SYN cookie validation or decoding. Instead, the server can simply extract the TCP options from the TCP ACK packet according to the standard format and then establish a TCP session using this information.

In some embodiments, the switch and the server can implement a security mechanism to ensure that only the TCP ACK packets sent by the switch are automatically accepted as valid by the server. For example, the switch can embed a security token into the TCP ACK packet (in addition to the TCP option information). This security token can be generated based on, e.g., a secret key that is shared between the switch and the server or a public key (using a typical public key encryption scheme), as well as data from the packet itself. Upon receiving the TCP ACK packet, the server can validate the security token to verify that the packet was sent by the switch (rather than a rogue host). This security mechanism adds an additional layer of protection and allows the server to discard false TCP ACK packets, even when, e.g., the reserved TCP option field noted above (kind=252) is present in the packets.

In further embodiments, the switch and the server can implement novel processing to handle certain TCP options (e.g., TCP timestamp) and certain scenarios (e.g., TCP ACK packet loss). These and other aspects of the present invention are described in the sections that follow.

2. Exemplary System Environment

Figure 2:
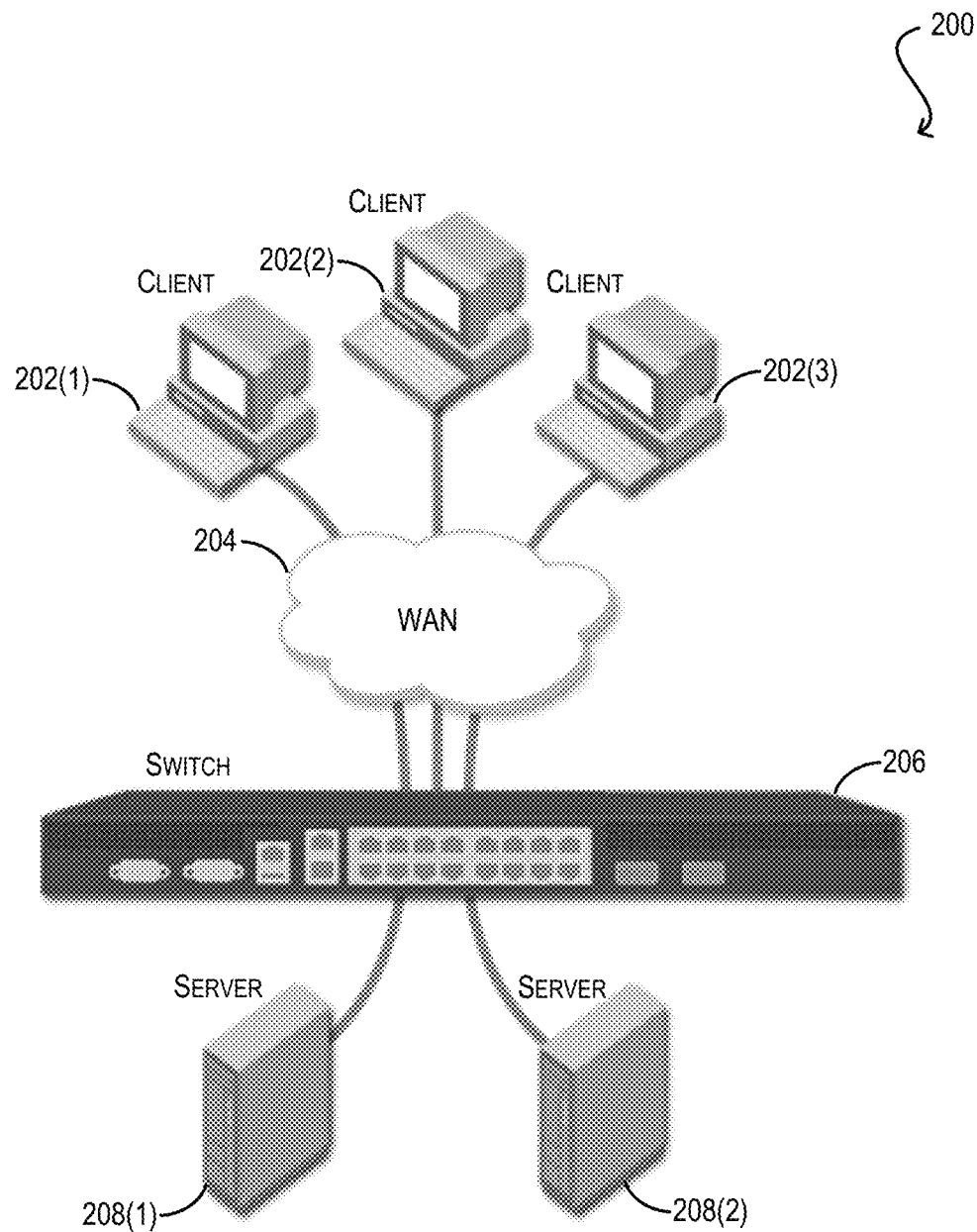
FIG. 2 depicts a system environment according to an embodiment.

FIG. 2 depicts a system environment 200 according to an embodiment. As shown, system environment 200 includes a number of client devices 202(1), 202(2), and 202(3) that are communicatively coupled with application servers 208(1) and 208(1) through a network 204 and a network switch 206. Although FIG. 2 depicts three client devices, two application servers, and one network switch, any number of these entities may be supported.

Client devices 202(1)-202(3) are end-user computing devices, such as a desktop computer, a laptop computer, a personal digital assistant, a smartphone, a tablet, or the like. In one embodiment, client devices 202(1)-202(3) can each execute (via, e.g., a standard web browser or proprietary software) a client component of a distributed software application hosted on application servers 208(1) and/or 208(2), thereby enabling users of client devices 202(1)-202(3) to interact with the application.

Application servers 208(1) and 208(2) are computer systems (or clusters/groups of computer systems) that are configured to provide an environment in which the server component of a distributed software application can be executed. For example, application servers 208(1) or 208(2) can receive a request from client device 202(1), 202(2), or 202(3) that is directed to an application hosted on the server, process the request using business logic defined for the application, and then generate information responsive to the request for transmission to the client device. In embodiments where application servers 208(1) and 208(2) are configured to host one or more web applications, application servers 208(1) and 208(2) can interact with one or more web server systems (not shown). These web server systems can handle the web-specific tasks of receiving Hypertext Transfer Protocol (HTTP) requests from client devices 202(1)-202(3) and servicing those requests by returning HTTP responses.

Network switch 206 is a network device that is configured to receive and forward data packets to facilitate delivery of the packets to their intended destinations. In a particular embodiment, network switch 206 is an application delivery switch and thus can perform various functions to enhance the delivery of applications that are hosted on application servers 208(1), 208(2) and consumed by client devices 202(1)-202(3). For instance, network switch 206 can intercept and process application data packets transmitted between the application servers and the client devices to provide, e.g., Layer 4 through 7 traffic redirection, server load balancing, automated failover, TCP connection multiplexing, server offload functions (e.g., SSL acceleration and TCP connection management), data compression, network address translation, and more. Network switch 206 can also provide integrated Layer 2/3 functionality, in addition to Layer 4 through 7 features.

In certain embodiments, network switch 206 and application servers 208(1), 208(2) can provide functionality for defending against DoS attacks, such as TCP SYN and/or ACK attacks, that are initiated by client devices 202(1)-202(3). In a particular embodiment, network switch 206 and application servers 208(1), 208(2) can provide this functionality while network switch 206 operates in a DSR (or other similar) mode, such that server-to-client data traffic does not pass through switch 206. In this manner, embodiments of the present invention can ensure that DoS attacks are prevented, while at the same time allowing network switch 206 to scale out and support a very large number of connections.

It should be appreciated that system environment 200 is illustrative and is not intended to limit embodiments of the present invention. For example, the various entities depicted in system environment 200 can have other capabilities or include other components that are not specifically described. One of ordinary skill in the art will recognize many variations, modifications, and alternatives.

3. TCP Connection Information Transfer

Figure 3:
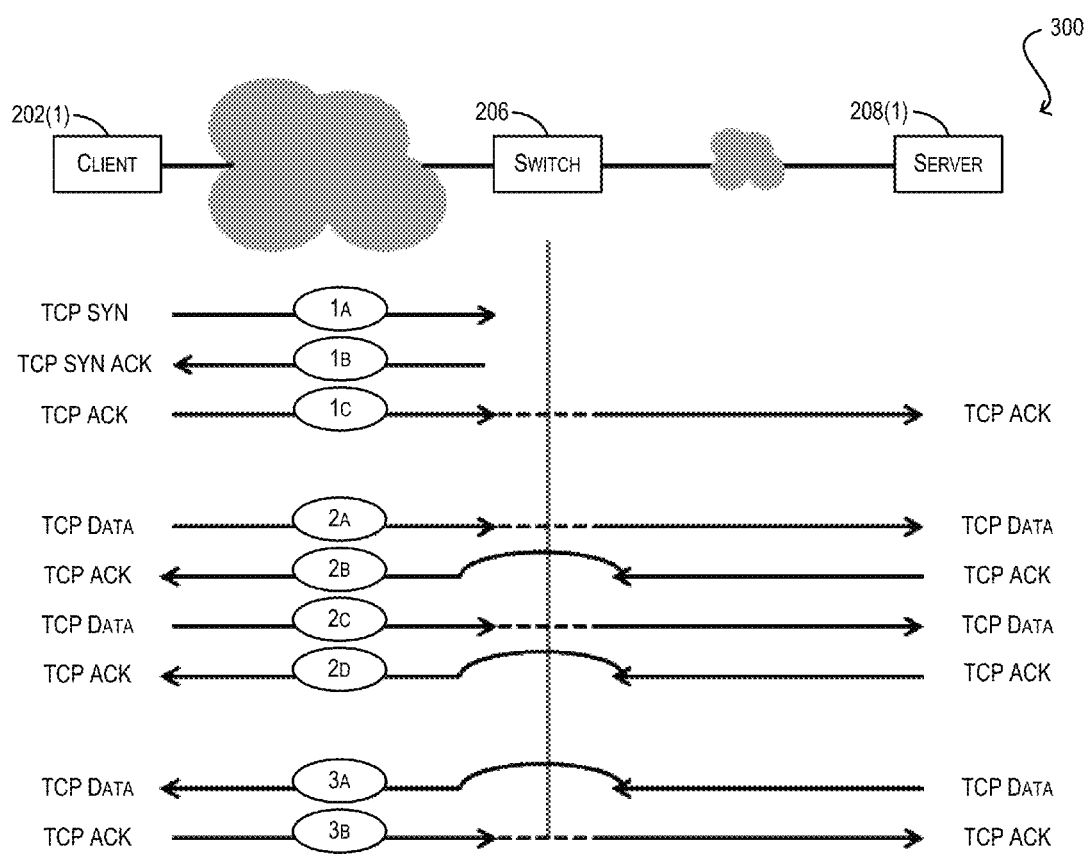
FIG. 3 depicts a TCP connection flow for protecting against DoS attacks that does not require server-to-client data traffic to pass through an intermediary network switch according to an embodiment.

FIG. 3 depicts a TCP connection flow 300 between client device 202(1), network switch 206, and application server 208(1) that protects server 208(1) against DoS attacks without requiring server-to-client data traffic to pass through switch 206 according to an embodiment. In this flow, network switch 206 can essentially transfer, via a TCP ACK packet, TCP connection information (e.g., client-generated sequence number, switch-generated sequence number, TCP options) that it has negotiated with client device 202(1) to application server 208(1). This enables application server 208(1) to establish a TCP session directly with client device 202(1).

At steps 1a and 1b of flow 300, client device 202(1) and network switch 206 can perform the first two parts of the TCP three-way handshake (i.e., exchanging TCP SYN and TCP SYN ACK packets). As part of generating the TCP SYN ACK packet, network switch 206 can generate a sequence number (referred to as a SYN cookie) that encodes the TCP option information originally provided by client device 202(1) via the TCP SYN packet. In one embodiment, network switch 206 can generate the SYN cookie using a SYN cookie algorithm that is secret to switch 206. The SYN cookie can be included in the SEQ# field of the TCP SYN ACK packet.

At step 1c, client device 202(1) can transmit a TCP ACK packet to network switch 206 in order to complete the TCP three-way handshake. The TCP ACK packet can include a client-generated sequence number in the SEQ# field and the switch-generated SYN cookie (+1) in the ACK# field. Network switch 206 can receive the TCP ACK packet, extract the SYN cookie from the packet (by subtracting 1 from the acknowledgement number in the ACK# field), and decode the SYN cookie using its SYN cookie algorithm. The output of this decoding includes the original TCP option information received from client device 202(1). Network switch 206 can then embed the (non-encoded) TCP options into the TCP ACK packet using a standard format (e.g., in a reserved TCP option field), and forward the TCP ACK packet to application server 208(1). In one embodiment, network switch 206 can embed the TCP options into the TCP ACK packet using a standard, published format (e.g., in a reserved TCP option field). In alternative embodiments, network switch 206 can embed the TCP options using a proprietary format that is agreed upon by both switch 206 and server 208(1).

Upon receiving the TCP ACK packet from network switch 206, application server 208(1) can identify the packet as originating from switch 206, disable its typical SYN cookie validation logic, and extract (1) the TCP options (per the standard or proprietary format), (2) the sequence number (i.e., the client-generated sequence number), and (3) the acknowledgement number (i.e., the SYN cookie) from the packet. Application server 208(1) can then establish a TCP session based on this TCP connection information.

Finally, at steps 2a-2d and 3a-3b, client device 202(1) and application server 208(1) can communicate back and forth via the created TCP session. Note that at steps 2b, 2d, and 3a, the TCP data traffic from application server 208(1) to client device 202(1) can completely bypass network switch 206.

Figure 4A:
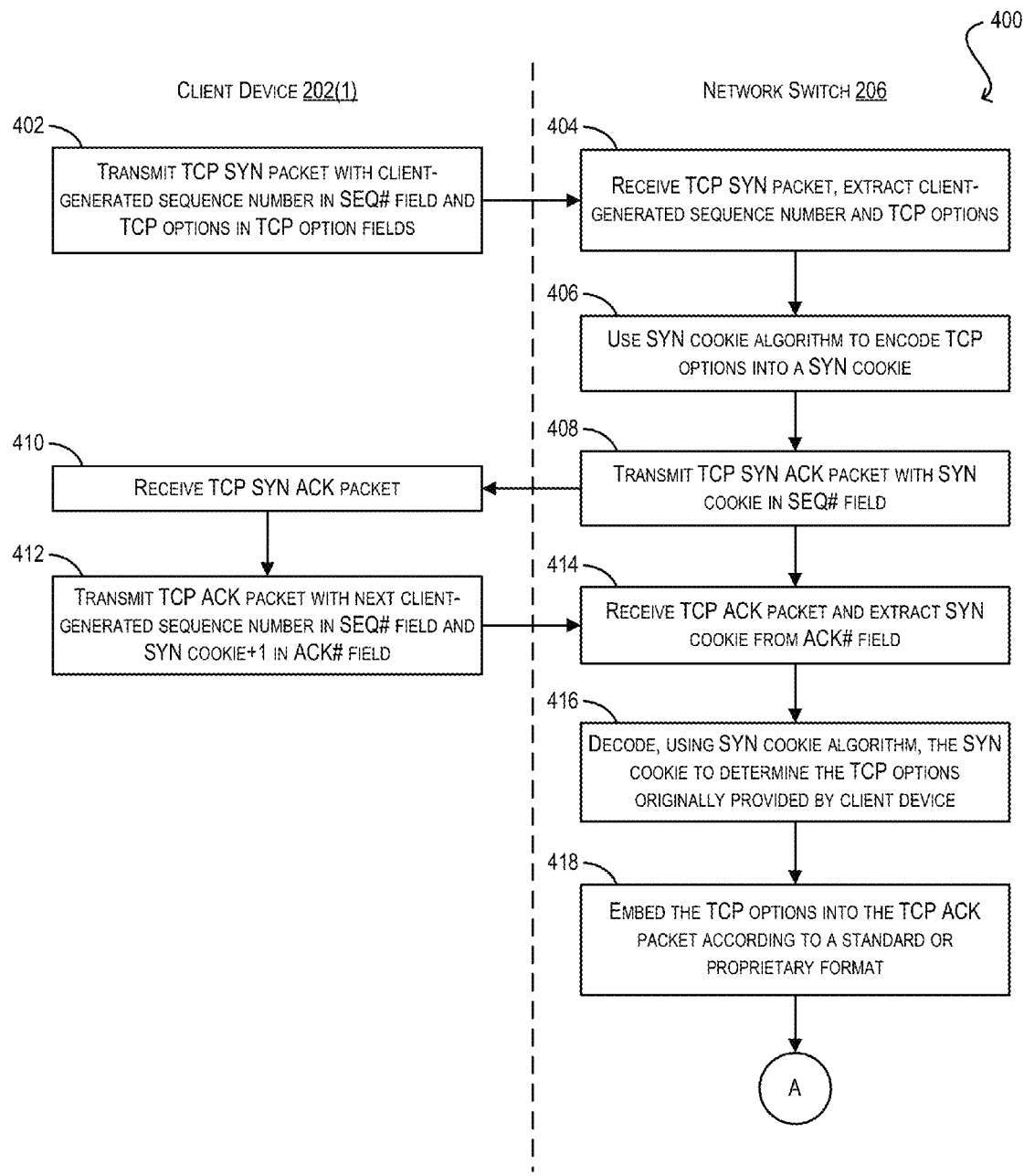
FIGS. 4A and 4B depict a flowchart that provides additional details regarding the flow of FIG. 3 according to an embodiment.
Figure 4B:
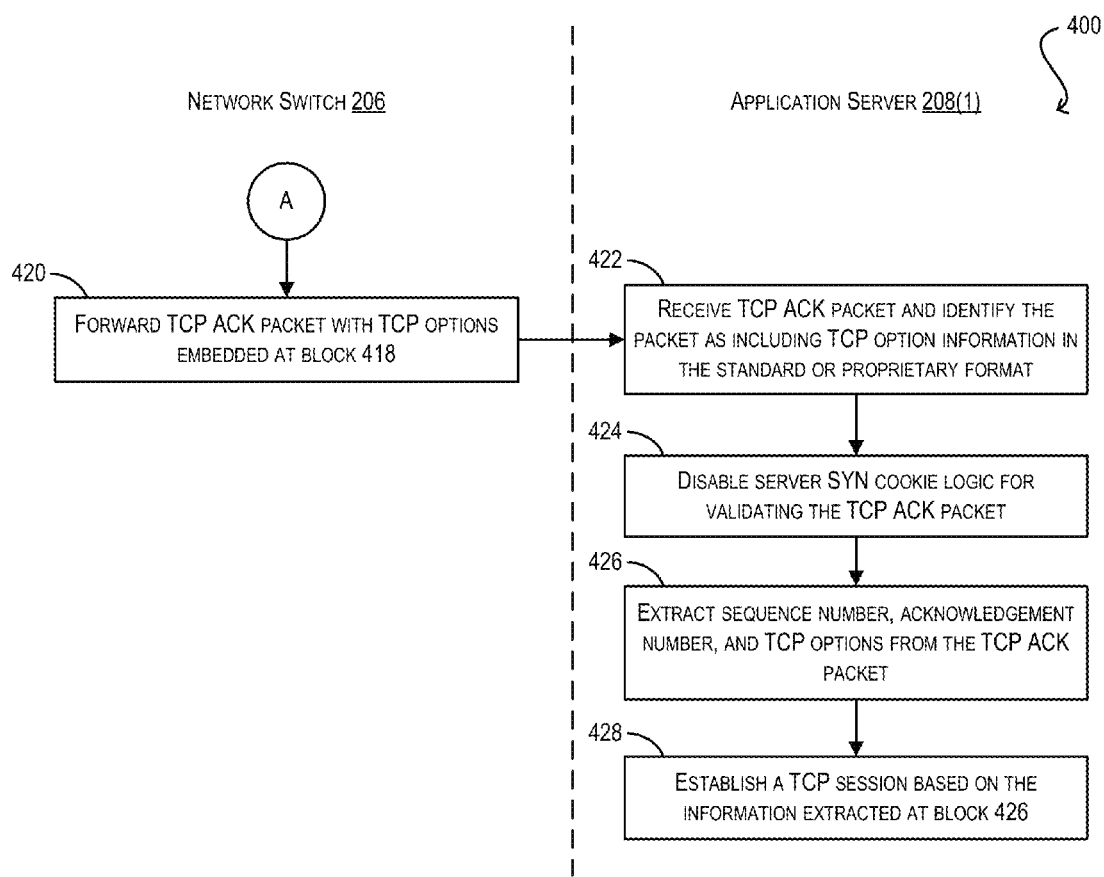

FIGS. 4A and 4B depict a flowchart 400 that provides additional details regarding steps 1a, 1b, and 1c of FIG. 3 according to an embodiment. At block 402, client device 202(1) can transmit a TCP SYN packet to network switch 206 that includes a client-generated sequence number in the SEQ# field and one or more TCP options in the TCP option fields.

At block 404, network switch 206 can receive the TCP SYN packet and extract the client-generated sequence number and TCP options. At block 406, network switch 206 can use its proprietary SYN cookie logic/algorithm (essentially a mathematical function that optionally uses one or more secrets or random input) to encode the TCP options received from client device 202(1). The result of this encoding is a value, referred to as a SYN cookie. At block 408, network switch 206 can transmit a TCP SYN ACK packet to client device 202(1) that includes the SYN cookie in the SEQ# field.

At blocks 410 and 412, client device 202(1) can receive the TCP SYN ACK packet and transmit a TCP ACK packet to network switch 206. The TCP ACK packet can include the next client-generated sequence number in the SEQ# field and the switch-generated SYN cookie (+1) in the ACK# field.

At block 414, network switch 206 can receive the TCP ACK packet and extract the SYN cookie generated at block 406 from the ACK# field of the packet. In one embodiment, this can comprise taking the acknowledgement number from the ACK# field and subtracting 1. Network switch 206 can then validate and decode the SYN cookie using its SYN cookie algorithm (block 416). The result of the decoding includes the original TCP options received from client device 202(1).

Once the SYN cookie is decoded, network switch 206 can embed the TCP options into the TCP ACK packet received from client device 202(1) (block 418). As noted previously, in certain embodiments network switch 206 can embed the TCP options according to a standard (e.g., published) format, such that any entity that is aware of the standard format can subsequently extract the TCP options. For example, in a particular embodiment, network switch 206 can embed the TCP options into a particular TCP option field of the TCP ACK packet having a reserved type, or kind (e.g., kind=252). Sections 4-8 below provide additional details regarding how these TCP options can be embedded and handled. Alternatively, network switch 206 can embed the TCP options according to a proprietary format. In this case, application server 208(1) should implement appropriate logic for extracting the TCP options from the packet based on the proprietary format. Network switch 206 can subsequently forward the TCP ACK packet (with the embedded TCP options) to application server 208(1) (block 420).

At block 422, application server 208(1) can receive the TCP ACK packet and identify the packet as including TCP option information in the standard or proprietary format discussed with respect to block 418. For instance, in one embodiment, application server 208(1) can identify the TCP ACK packet as including a TCP option field having kind=252.

In response to the identification at block 422, application server 208(1) can disable its own SYN cookie logic/algorithm for validating the TCP ACK packet (block 424). Note that since application server 208(1)'s validation logic is different from the SYN cookie logic of network switch 206 that created the SYN cookie in the packet, this step prevents application server 208(1) from rejecting the TCP ACK packet.

At block 426, application server 208(1) can extract the sequence number (corresponding to the client-generated sequence number), the acknowledgement number (corresponding to the SYN cookie+1), and the TCP options from the TCP ACK packet. Since the TCP options are embedded according to the standard format, application server 208(1) can know how to extract these options without performing any SYN cookie decoding.

Finally, at block 428, application server 208(1) can establish a TCP session using the sequence number, acknowledgement number, and TCP options extracted at block 426.

4. TCP Option Handling

As noted above with respect to block 418 of FIG. 4A, in certain embodiments network switch 206 can embed TCP option information into the TCP ACK packet according to a standard format so that application server 208(1) can easily extract this information. This can be handled in a number of different ways. For example, it is possible to encode the TCP option information in one of the standard TCP/IP header fields of the TCP ACK packet. However, this approach may violate RFCs or other standards, and thus may not be ideal for certain implementations.

In one embodiment, network switch 206 can embed the TCP option information into the TCP ACK packet via a TCP option field having a reserved type (kind). For example, reserved TCP option kind 252 can be used for this purpose. The following is an example representation of TCP option kind 252 that has a length of 26 bytes and that effectively encapsulates all of the popular TCP options present in the original client-side TCP three-way handshake. Encapsulated within this new TCP option are the original client-side TCP options presented in a format that follows the standard RFC guidelines for each of those options. This approach will allow any entities en-route to safely ignore the new option altogether if they follow TCP RFC 793.

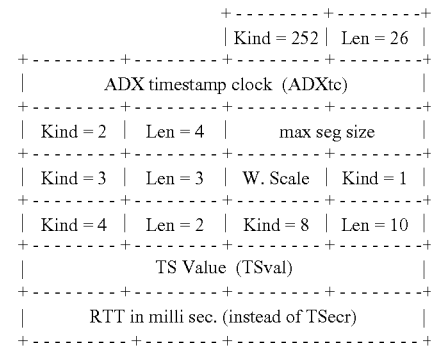

This proposed new TCP option follows the standard TCP option format and starts with Kind 252 and has a Length field whose value is variable and depends on the number and type of TCP options that need to be communicated to application server 208(1). The first 4 byte field following Length may be always present and indicates the current value of the switch timestamp clock (ADXtc) measured in milliseconds. This is needed for proper operation of the TCP timestamp option if it is enabled on network switch 206 (and application server 208(1)) and is requested by client device 202(1) in the TCP SYN packet. Following the ADXtc field are TCP options that are negotiated between client device 202(1) and network switch 206 during the TCP three-way handshake. In this example, MSS, Window Scale, SACK permit and timestamp options are supported. Depending on which TCP options were negotiated on the client-side, zero or more of these options may be encapsulated within this new TCP option.

5. TCP Timestamp Option Handling

In case of the TCP Timestamp option, special care may be needed to handle the value of TSecr in the TCP ACK packet. In some embodiments, TSecr as received by network switch 206 cannot be forwarded as-is to application server 208(1) because TSecr reflects the timestamp network switch 206 used when it generated the TCP SYN ACK packet. Since the reference clock network switch 206 uses is different from the reference clock application server 208(1) uses for timestamps, this TSecr value is meaningless to application server 208(1) and could lead to incorrect RTT calculation. In addition, in certain embodiments, there is a requirement that timestamp TSVal used in the packets by a sender has to be monotonously increasing—otherwise it would lead to packet drops due to PAWS (refer to RFC 1323 for details). These requirements mean network switch 206 should communicate two things to application server 208(1) with the TCP ACK packet at block 420 of flowchart 400:
    1. RTT as observed by network switch 206—RTT is more meaningful to application server 208(1) than the TSecr value itself. Application server 208(1)'s SYN cookie logic can add its own reference clock to this RTT value to get the equivalent of the TSecr value. Note that this does not take into account the RTT between network switch 206 and application server 208(1) itself. Typically, application server 208(1) will be close to network switch 206 and hence ignoring the RTT between network switch 206 and application server 208(1) should not make much of a difference. However, in some cases, such as remote servers, RTT between network switch 206 and application server 208(1) should not be ignored. In such cases (and optionally for all cases), network switch 206 can provide the effective RTT from client device 202(1) to application server 208(1). This can be computed as the aggregate of switch-to-server RTT (measured by periodic health checks to application server 208(1)) and the RTT observed by network switch 206 for this connection to client device 202(1) (measured by TSecr in the TCP ACK packet received from client device 202(1)).

2. The actual TSVal used—This actual timer (specified by ADXtc in the new TCP option, kind=252) value is useful as the TSVal in the subsequent packets sent by application server 208(1) should have a value higher than this value to ensure a monotonously increasing TSVal. For the timestamp option to work seamlessly, application server 208(1) should save the delta between TSVal used by network switch 206 (current ADXtc) and the local timer that is the basis for application server 208(1)'s TSVal for each TCP connection. Every time application server 208(1) sends a packet out for this connection, it should add this TSval delta to the timestamp option's TSVal in the packet, if the timestamp option is present.

6. Packet Loss Handling

Section 4 above describes how a new TCP option may be added to the TCP ACK packet transmitted from network switch 206 to application server 208(1) in order to transfer TCP connection information to application server 208(1). However, it is possible that the TCP ACK packet is lost during transit to application server 208(1). In such a case, the first packet application server 208(1) would receive would be a TCP data packet from client device 202(1) (identified at step 2a of FIG. 3). Since this first data packet from client device 202(1) will have the same SEQ# as the TCP ACK sent at step 1c of FIG. 3, application server 208(1) can still accept this packet as a valid packet and continue even though it never received the original TCP ACK packet. For this to work properly, network switch 206 should embed the TCP option information (e.g., TCP option kind=252) in this first client data packet (step 2a of FIG. 3) in addition to the TCP ACK packet (step 1c of FIG. 3).

In certain embodiments, there is no need for network switch 206 to embed the TCP option information into the subsequent data packets (for instance, step 2c of FIG. 3). If application server 208(1) does not receive the TCP ACK packet (step 1c) and the first data packet (step 2a), but receives the second TCP data packet (step 2c), then the server's SYN cookie algorithm should discard it. Application server 208(1) will discard it because this second data packet (step 2c) will not have the new TCP option (kind=252) and hence will not bypass the server's SYN cookie validation.

7. TCP Re-Segmentation Due to New TCP Option Insertion

As explained above, the new TCP option can be embedded in the first client data packet (step 2a of FIG. 3) in addition to the TCP ACK packet (step 1c of FIG. 3). In such a case, if the TCP data packet is a full-size packet (e.g. 1460 bytes for standard Ethernet without jumbo), then insertion of the new TCP option can result in network switch 206 re-segmenting the packet, effectively generating two packets.

8. Summary of Server-Side Processing

Figure 5:
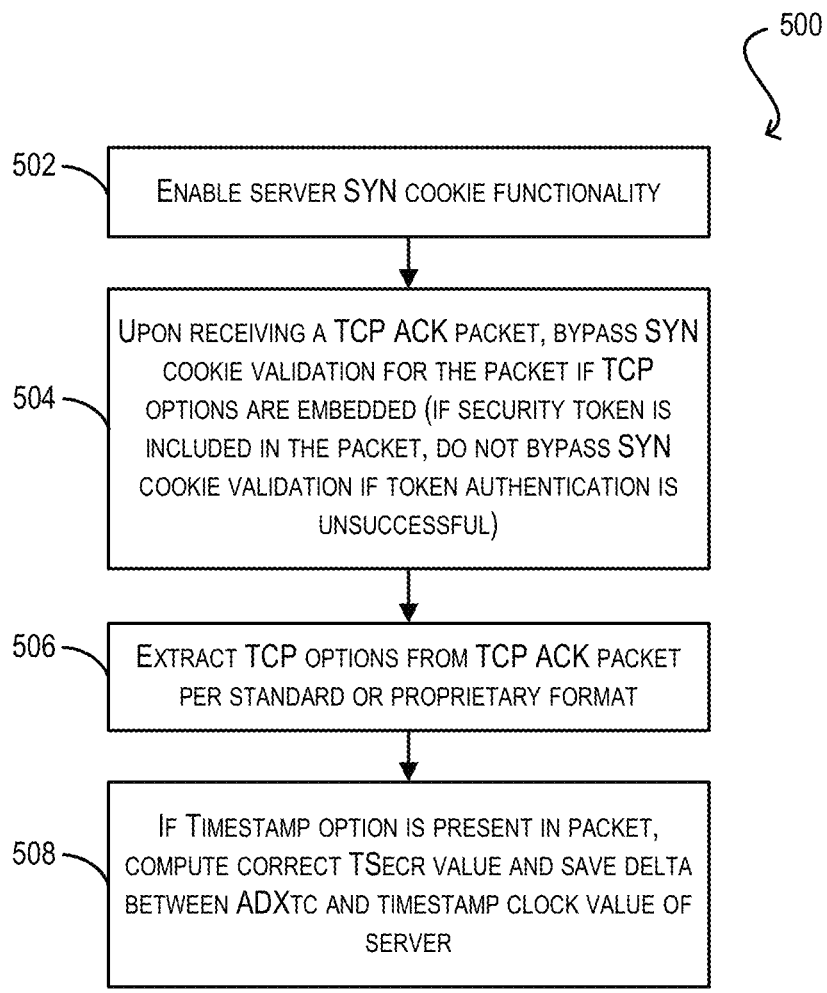
FIG. 5 depicts a process performed by a server for processing a TCP ACK packet according to an embodiment.

FIG. 5 depicts a flowchart 500 that summarizes the processing that the TCP stack of application server 208(1) can perform upon receiving a TCP ACK packet according to an embodiment.

At block 502, the SYN cookie logic for application server 208(1) can be enabled.

At block 504, the SYN cookie validation for validating a received TCP ACK packet can be bypassed if, e.g., TCP option kind=252 is present. If security token based validation is enabled on the server, the SYN cookie validation can be bypassed only if the security token is successfully authenticated via, e.g., a key shared with network switch 206.

At block 506, the TCP options embedded in the TCP ACK packet can be extracted per block 426 of flowchart 400. The TCP options can include ADXtc (the switch timestamp clock), options negotiated with the client device (e.g., MSS, SACK, Window Scale and Timestamp), and RTT as specified in the TSecr value of the Timestamp option (if Timestamp option is present).

At block 508, if the Timestamp option is present, a correct TSecr value can be computed by adding RTT (retrieved from TSecr of the packet) to the timestamp clock value of application server 208(1). In addition, the delta between ADXtc and the timestamp clock value of application server 208(1) can be saved in a TCP control block of the connection. This delta can be subsequently added to the TSVal of the Timestamp option (if present) for every TCP packet sent by application server 208(1) for the connection.

9. Exemplary Network Switch

Figure 6:
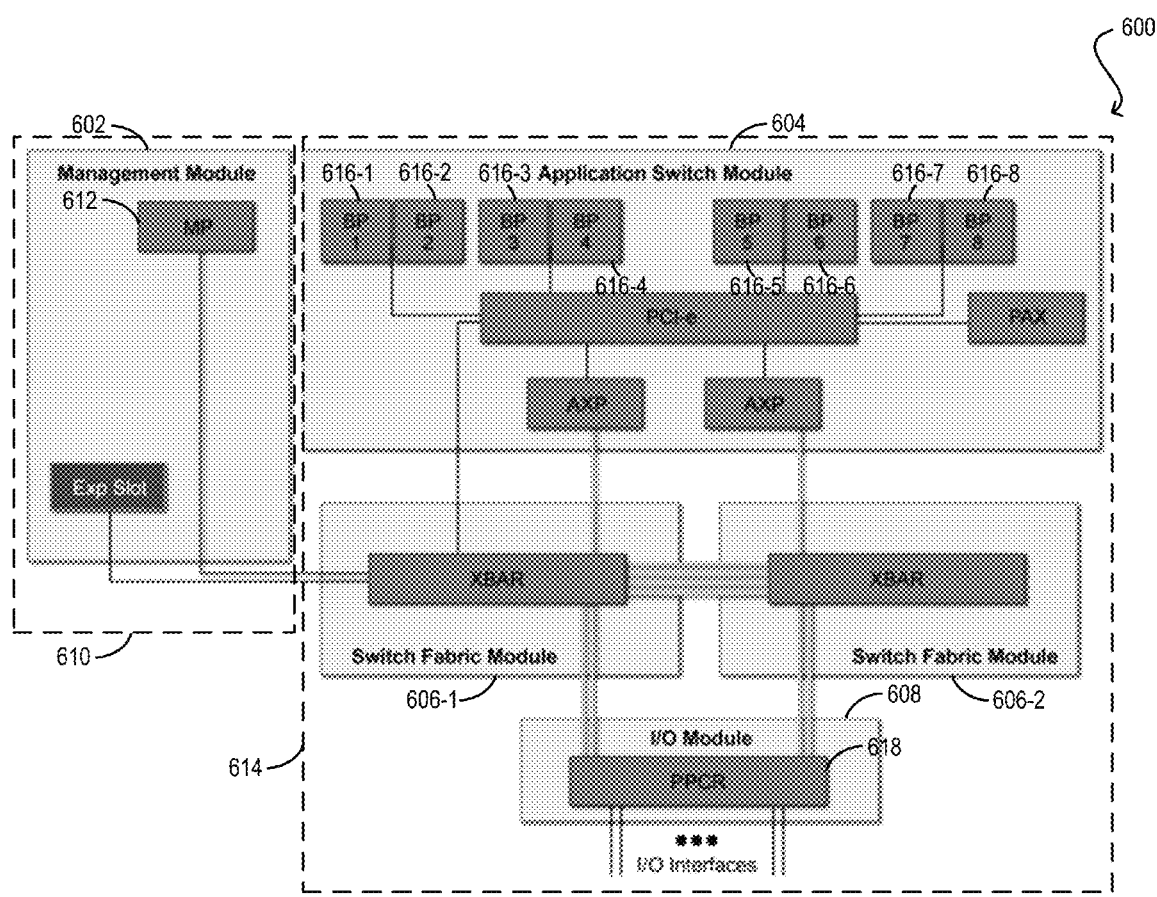
FIG. 6 depicts an exemplary network switch according to an embodiment.

FIG. 6 depicts a network switch 600 according to an embodiment of the present invention. In a particular embodiment, network switch 600 can be an application delivery switch and can be used to implement switch 206 of FIGS. 2, 3, 4A, and 4B.

As shown in FIG. 6, network switch 600 can include a management module 602, an application switch module 604, switch fabric modules 606-1 and 606-2, and an I/O module 608. Although FIG. 6 depicts one management module, one application switch module, two switch fabric modules, and one I/O module, any number of these components can be supported. For example, modules 602, 604, 606-1, 606-2, and 608 can each be implemented as a blade that is insertable into (or removable from) one of a plurality of modular slots in the chassis of network switch 600. In this manner, network switch 600 can accommodate any number of these modules according to differing network topologies and switching requirements.

Management module 602 represents the control plane (610) of network switch 600 and can include one or more management processors 612 that execute the management and/or control functions of network switch 600. Management processor 612 can be a general purpose CPU, such as a PowerPC, Intel, AMD, or ARM microprocessor, that operates under the control of software stored in an associated memory (not shown).

Application switch module 604, which is part of the data plane (614) of network switch 600, can include a number of application cores 616-1 to 616-8. Like management processor 612, application cores 616-1 to 616-8 can be CPUs (or cores within a larger CPU) that operate under the control of software stored in an associated memory. In a particular embodiment, application cores 616-1 to 616-8 can be barrel processors. Application cores 616-1 to 616-8 can carry out the various functions attributed to network switch 206 in FIGS. 2, 3, 4A, and 4B.

Switch fabric modules 606-1, 606-2 and I/O module 608 are also part of data plane 614 of network switch 600. Switch fabric modules 606-1 and 606-2 are configured to interconnect the various other modules of network switch 600. I/O module 608 (also known as a line card) can include one or more input/output ports that are used by network switch 600 to send and receive data packets. These ports can send and receive various types of data traffic at different speeds including 1 Gigabit per second, 10 Gigabits per second, 40 Gigabits per second, or 100 Gigabits per second. I/O module 608 can also include one or more packet processors (e.g., PPCR 618). Packet processor 618 is a specialized hardware component (e.g., an FPGA or ASIC) that can make wire speed decisions on how to handle incoming or outgoing data packets. In some embodiments, these decisions can be made in conjunction with information stored in a Content Addressable Memory (CAM) (not shown). One of the decisions that can be made by packet processor 618 is whether a packet needs to be sent to application switch module 604 for Layer 4-7 processing.

It should be appreciated that network switch 600 is illustrative and not intended to limit embodiments of the present invention. Many other configurations having more or fewer components than switch 600 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   extracting, by a network device, one or more values from a Transmission Control Protocol (TCP) ACK packet sent by a client device, the one or more values encoding TCP option information;
   decoding, by the network device, the one or more values to determine the TCP option information;
   embedding, by the network device, the decoded TCP option information into the TCP ACK packet; and
   forwarding, by the network device, the TCP ACK packet with the embedded TCP option information to a server.

2. The method of claim 1 wherein the one or more values were previously generated by the network device and transmitted to the client device via a TCP SYN-ACK packet in response to receiving a TCP SYN packet from the client device.

3. The method of claim 2 wherein the TCP option information was originally included in the TCP SYN packet.

4. The method of claim 1 wherein the decoding is performed via an algorithm that is kept secret from the client device and the server.

5. The method of claim 4 wherein the one or more values include a SYN cookie and the algorithm is a SYN cookie algorithm.

6. The method of claim 1 wherein embedding the decoded TCP option information into the TCP ACK packet comprises including the decoded TCP option information in a TCP option field of the TCP ACK packet that has a reserved type.

7. The method of claim 6 wherein the reserved type is identified by kind number 252.

8. The method of claim 6 wherein the TCP option information included in the TCP option field includes max segment size (MSS), window scale, SACK permit, and timestamp.

9. The method of claim 1 wherein embedding the decoded TCP option information into the TCP ACK packet comprises including the decoded TCP option information in a TCP/IP header field of the TCP ACK packet.

10. The method of claim 1 further comprising, subsequent to the forwarding:
    receiving a first TCP data packet from the client device that is destined for the server;
    embedding the decoded TCP option information into the first TCP data packet; and
    forwarding the first TCP data packet with the embedded TCP option information to the server.

11. The method of claim 1 further comprising, prior to the forwarding:
    embedding a security token into the TCP ACK packet.

12. The method of claim 1 wherein extracting the value from the TCP ACK packet comprises:
    extracting an acknowledgement value from an acknowledgement number field of the TCP ACK packet; and
    subtracting 1 from the acknowledgement value.

13. A network device comprising:
    a processor; and
    a non-transitory computer readable medium having stored thereon executable program code which, when executed by the processor, causes the processor to:
       extract one or more values from a TCP ACK packet sent by a client device, the one or more values encoding TCP option information;
       decode the one or more values to determine the TCP option information;
       embed the decoded TCP option information into the TCP ACK packet; and
       forward the TCP ACK packet with the embedded TCP option information to a server.

14. The network device of claim 13 wherein the network device is an application delivery switch.

15. A non-transitory computer readable medium having stored thereon program code executable by a processor, the program code comprising code that when executed causes the processor to:
    extract one or more values from a TCP ACK packet sent by a client device, the one or more values encoding TCP option information;
    decode the one or more values to determine the TCP option information;
    embed the decoded TCP option information into the TCP ACK packet; and
    forward the TCP ACK packet with the embedded TCP option information to a server.

16. A method comprising:
    receiving, by a server, a TCP ACK packet from a network switch, wherein the TCP ACK packet originated from a client device communicatively coupled with the network switch, and wherein the TCP ACK packet includes TCP option information decoded by the network switch from one or more values originally encoded in the TCP ACK packet;

identifying, by the server, the TCP ACK packet as including the decoded TCP option information;
extracting, by the server, the decoded TCP option information from the TCP ACK packet; and
establishing, by the server, a TCP session with the client device based on the decoded TCP option information.

17. The method of claim 16 further comprising, upon identifying the TCP ACK packet as including the decoded TCP option information:
disabling SYN cookie validation of the TCP ACK packet.

18. The method of claim 16 wherein identifying the TCP ACK packet as including the decoded TCP option information comprises:
identifying the TCP ACK packet as including a TCP option field that has a particular reserved type.

19. The method of claim 18 wherein the particular reserved type is identified by kind number 252.

20. The method of claim 18 wherein extracting the decoded TCP option information from the TCP ACK packet comprises:
extracting the decoded TCP option information from the TCP option field.

21. The method of claim 16 wherein the decoded TCP option information includes max segment size (MSS), window scale, SACK permit, and timestamp.

22. The method of claim 19 further comprising:
extracting a security token from the TCP ACK packet; and
validating the TCP ACK packet as having been sent by the network switch based on the security token.

23. A computer system comprising:
a processor; and
a non-transitory computer readable medium having stored thereon executable program code which, when executed by the processor, causes the processor to:
receive a TCP ACK packet from a network switch, wherein the TCP ACK packet originated from a client device communicatively coupled with the network switch, and wherein the TCP ACK packet includes TCP option information decoded by the network switch from one or more values originally encoded in the TCP ACK packet;
identify the TCP ACK packet as including the decoded TCP option information;
extract the decoded TCP option information from the TCP ACK packet; and
establish a TCP session with the client device based on the decoded TCP option information.

24. A non-transitory computer readable medium having stored thereon program code executable by a processor, the program code comprising code that when executed causes the processor to:
receive a TCP ACK packet from a network switch, wherein the TCP ACK packet originated from a client device communicatively coupled with the network switch, and wherein the TCP ACK packet includes TCP option information decoded by the network switch from one or more values originally encoded in the TCP ACK packet;
identify the TCP ACK packet as including the decoded TCP option information;
extract the decoded TCP option information from the TCP ACK packet; and
establish a TCP session with the client device based on the decoded TCP option information.

25. A method comprising:
identifying, by a server, a received TCP ACK packet as including TCP option information;
upon performing the identifying, disabling, by the server, SYN cookie validation of the TCP ACK packet;
extracting, by the server, the TCP option information from the TCP ACK packet; and
establishing, by the server, a TCP session based on the TCP option information.

* * * * *